Figure 1:
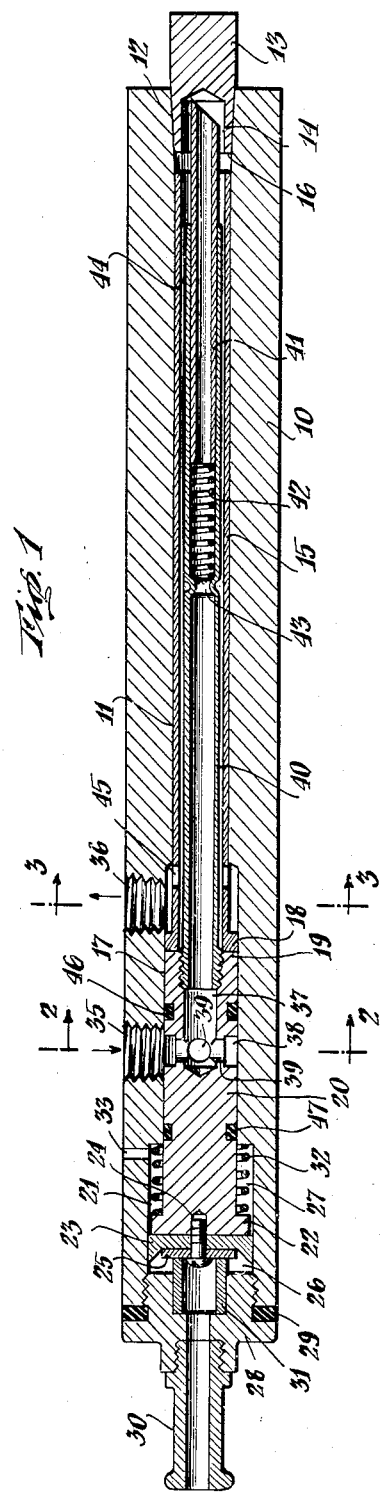

Feb. 8, 1949.  E. I. LARSEN  2,460,889

EJECTOR TYPE WELDING ELECTRODE HOLDER

Filed May 28, 1946

INVENTOR.
Earl I. Larsen
BY
Nicholas Lange
ATTORNEY

Patented Feb. 8, 1949

2,460,889

UNITED STATES PATENT OFFICE 2,460,889

EJECTOR TYPE WELDING ELECTRODE HOLDER

Earl I. Larsen, Indianapolis, Ind., assignor to P. R. Mallory & Co., Inc., Indianapolis, Ind., a corporation of Delaware Application May 28, 1946, Serial No. 672,857

7 Claims. (Cl. 219—4)

This invention relates to welding electrode holders for resistance welding.

This invention further relates to welding electrode holders in which the welding electrode is adapted to be ejected from the holder.

In resistance welding machines, the electrodes are ordinarily supported by an electrode holder which supplies cooling fluid to the inside of the electrode as the welding operation proceeds. It is customary to provide the electrode holder with a tapered socket in which the welding electrode or tip fits and the holder is usually provided with a cooling fluid conduit which extends into a recessed portion of the electrode to supply it with cooling fluid. It is oftentimes necessary to remove or replace the welding electrodes, due to wear or deformation, and different types of work require the substitution of different electrodes. The electrode tip should fit quite closely and tightly into the socket in order to assure good electrical conductivity and mechanical support as well as to prevent leakage of the cooling fluid. When removing such an electrode tip from a holder which is not provided with an ejector device, the welding electrode must be twisted with a pair of pliers, a pipe wrench or similar tool until it has loosened sufficiently to permit removal thereof from the holder.

The obvious difficulties of this method of removal were overcome, in part, by the ejector-type welding electrode holder such, for example, as the holder described in Hensel and Larsen Patent No. 2,215,289. In this patent, an ejector tube is disposed inside the barrel or body of the electrode holder and this tube extends from the welding electrode to a stuffing box or packing gland at the rear of the holder. The tube may have cooling fluid inlet and outlet fixtures attached thereto for supplying cooling fluid to the welding electrode. When the electrode is to be removed, the tube is struck a blow with a hammer or mallet thus forcing the tube against the electrode and loosening the latter from the tapered socket.

Difficulties have arisen in the use of this type of electrode holder in that it is very difficult to provide a stuffing box or packing gland which remains water tight for a long period of time. Accordingly, frequent repacking or adjustment of the stuffing box is necessary in order to insure proper functioning of the electrode holder.

In accordance with this invention, the stuffing box and its attendant disadvantages is altogether eliminated by the use of an internal piston which is operated by fluid pressure, such piston being adapted to engage the ejector tube to force it against the welding tip, thus loosening the tip from the holder. The piston may be readily sealed without the use of a stuffing box or packing gland so that water leakage is effectively prevented. In addition, the novel construction of the electrode holder is such that the cooling fluid is automatically turned off both at the inlet and outlet when the welding tip is removed, thus preventing leakage or spilling of the cooling fluid. The piston may be operated by any suitable source of fluid pressure so that it is not necessary to strike the ejector tube with a mallet or hammer when it is desired to remove the welding electrode.

It is an object of this invention to provide a welding electrode holder in which the welding tip may be ejected by the application of fluid pressure. It is a further object of the invention to provide a welding electrode holder in which leakage or spilling of cooling fluid is eliminated or greatly minimized.

It is a still further object of the invention to provide a welding electrode holder which is of rugged construction, reliable in operation, and which may be manufactured at a low cost.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

Figure 3:
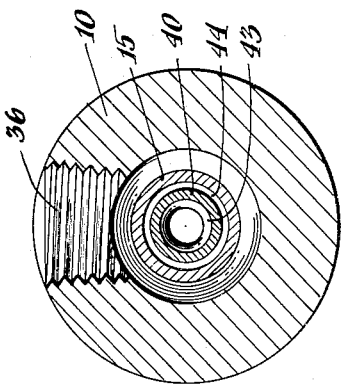
Figure 2:
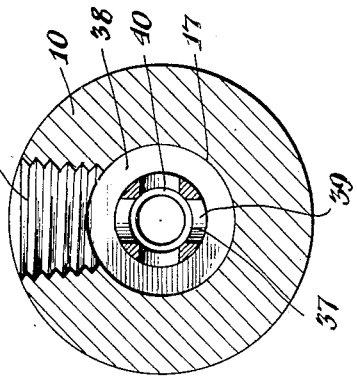

For a fuller understanding of the nature and objects of the invention as well as for specific fulfillment thereof, reference should be had to the following detailed description taken in connection with the accompanying drawings, in which:

Figure 1 is a vertical sectional view of a welding electrode holder construction in accordance with the present invention;

Figures 2 and 3 are, respectively, sectional views taken along the lines 2—2 and 3—3 of Figure 1.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail and particularly to Figure 1, a barrel type welding electrode holder is shown comprising a hollow body 10 through which extends a longitudinal passage 11. One end of the passage 11 is tapered as at 12 to receive a welding electrode or tip 13 having a cooling fluid recess 14 therein. The body portion or barrel 10 is adapted to be clamped in an arm of a suitable resistance welding machine.

An ejector member or tube 15 is disposed within the passage 11 and said tube is adapted to move longitudinally of the body 10 into engagement with the end 16 of the welding electrode. The other end of the tube 15 extends into an enlarged portion 17 of the passage 10 and is provided with a flange 18 which is adapted to fit against the walls of the passage. The flanged portion 18 is adapted to be engaged by one end 19 of a piston 20 which is movable longitudinally of the passage 17. The other end of the piston extends into a recess 21 formed in the body 10 and this end of the piston is flanged as at 22 for engagement with the walls of the chamber. A washer 23 of leather, rubber or other suitable material is secured to the flanged end of the piston by a screw 24 and a metallic washer 25, said washer 23 serving to divide the recess 21 into a pressure chamber 26 and a piston chamber 27. The pressure chamber 26 is partially defined by a cap 28 which is screw-threaded to the interior of the passage and sealed by a suitable washer 29.

Fluid under pressure may be admitted to the chamber 26 by a nipple 30, which is screw-threaded on the cap 28, and a hose 31. When fluid under pressure is admitted to chamber 26, the piston 20 is forced inwardly into engagement with the ejector tube 15 which, in turn, engages the welding electrode 13 to thereby force or loosen it from the socket 12. When the fluid pressure is removed from the chamber 26, the piston is returned to its original position by a compression spring 32 which is mounted in the chamber 27. I prefer to utilize compressed air as the fluid for operating the piston as compressed air is readily available at most places where resistance welding machines are used. In order that the air pressure shall not become unduly high in the chamber 27 as the piston moves inwardly, a vent 33 is provided so that the interior of chamber 27 is maintained at substantially atmospheric pressure in any position of the piston 20.

The water cooling system for the electrode holder comprises an inlet 35 and an outlet 36 which are formed in the body or barrel 10 and are suitably threaded to receive a water inlet and outlet valve, respectively. With the piston 20 in the position shown, the inlet 35 communicates with an interior recessed portion 37 of the piston through an annular passage 38 and bores 39. The passage 37, in turn, communicates with a cooling fluid conduit 40 which is of smaller diameter than the ejector tube 15, said conduit being screw-threaded to the interior portions of the recess 37. A conduit 41 is telescoped within the conduit 40 and the conduit 41 is urged into engagement with the recessed portion of the welding tip by a compression spring 42 which is secured, at one end thereof, to a collar 43 formed in the conduit 40 and, at the other end thereof, to the conduit 41. When the welding machine is operated, cooling fluid passes through the inlet 35, conduit 40, and conduit 41 to the recessed portion 14 of the tip. Thence, the cooling fluid passes to the outlet 36 through the interspace 44 between conduit 40 and ejector tube 15. It will be noted that the tube 15 is provided with suitable passages 45 through which the cooling fluid flows from the interspace 44 to the outlet 36. The space between the piston and the electrode holder 10 is preferably sealed by a gasket 46 disposed between the inlet and outlet as well as by a gasket 47 disposed between the inlet 35 and the adjacent end of the electrode holder.

The operation of the novel electrode holder will be readily apparent from the detailed description. When fluid under pressure is admitted through nipple 30 into pressure chamber 26, the piston moves inwardly thus forcing the ejector tube 15 into engagement with the tip and ejecting the same from the socket 12. It will be understood a suitable air line may be connected to the nipple 30 for the purpose of applying fluid pressure to the chamber 26. This air line should preferably be provided with a suitable valve for successively applying pressure to the chamber in case the first pressure application fails to loosen the tip sufficiently to allow removal thereof or in case it is necessary that the welding electrode be frequently replaced. At the same time, the annular groove 38 moves out of register with the inlet 35 so that the supply of cooling fluid to the electrode holder is cut off. Furthermore, as the ejector tube 15 moves into engagement with the tip, the passages 45 are no longer in register with the outlet 36 whereby the cooling fluid outlet is also closed. When the fluid pressure is removed from the chamber 26, the spring 32 forces the piston outwardly to its original position so that the annulus 38 registers with inlet 35 and the passages 45 are in register with the outlet 36. Thereupon, the flow of cooling fluid through the electrode holder is resumed.

It will be apparent that the novel electrode holder of the present invention obviates the necessity of providing a stuffing box or packing gland for the ejector tube and that the construction of the novel electrode holder is simple and economical. When the tip is ejected, the supply of cooling fluid is shut off so that the inconvenience of having the fluid escape from the electrode holder while the tip is being changed is positively eliminated.

The tip is ejected solely by the fluid pressure applied to the chamber 26 thus eliminating the necessity of striking the ejector tube with a mallet or hammer. The use of fluid pressure for this purpose affords smoother operation and avoids much of the wear previously caused by striking the tube with a tool in order to eject the tip.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. An ejector type welding electrode holder comprising a hollow body, a socket therein for receiving a welding electrode, an ejector member adapted to move into engagement with said electrode to eject it from the socket, a piston disposed in said body and adapted to engage said ejector member, a cooling fluid inlet and a cooling fluid outlet, means for delivering cooling fluid from the inlet to the welding electrode and then returning the cooling fluid to said outlet, and means for applying fluid pressure to said piston to force it into engagement with said member to thereby eject said welding electrode, said piston and said member being constructed and arranged to close said cooling fluid inlet and said cooling fluid outlet when moved to said electrode ejecting position.

2. An ejector type welding electrode holder comprising a hollow body, a socket therein for receiving a welding electrode, ejector means including a member adapted to move into engagement with said electrode to eject it from the socket and a piston adapted to engage said ejector member, a cooling fluid inlet and a cooling fluid outlet, said ejector means having openings formed therein communicating with said inlet and said outlet in one position of said piston means for delivering cooling fluid from the inlet through one of said openings to the welding electrode and returning the cooling fluid through another of said openings to the outlet, means for applying fluid pressure to said piston to force it into engagement with said member to thereby eject said welding electrode, said movement of the piston also being effective to close said cooling fluid inlet and said cooling fluid outlet, and means for retracting said piston after the fluid pressure has been removed therefrom, the retraction of said piston being effective to open said cooling fluid inlet and said cooling fluid outlet.

3. In an ejector type welding electrode holder, a body including a longitudinally-extending passage, a socket for receiving a welding electrode at one end of said passage, an ejector tube disposed in said passage and adapted to engage said electrode, a piston mounted in an enlarged portion of said passage for engagement with said ejector tube, said piston having an inner recessed portion which normally communicates with a cooling fluid inlet provided in said body, a conduit secured to said piston and communicating with said recessed portion, said conduit extending through said passsage to supply cooling fluid to said welding electrode, the interspace between said conduit and said ejector tube normally communicating with a cooling fluid outlet formed in said body, a pressure chamber associated with said piston, and means for applying fluid pressure to said chamber to force the piston into engagement with said ejector tube and thereby eject said welding electrode, the movement of said piston also being effective to move said recessed portion out of communication with said inlet thereby to close said cooling fluid inlet.

4. In an ejector type welding electrode holder, a hollow body, a socket therein for receiving a welding electrode, an ejector tube disposed in said hollow body and adapted to bear against said welding electrode, a piston disposed in said body for engagement with said tube, a cooling fluid conduit mounted inside said tube and secured to said piston, said conduit consisting of inner and outer telescopic sections, means for urging the inner section into engagement with the welding electrode, a cooling fluid inlet and a cooling fluid outlet formed in said tube, means including an opening formed in said piston for establishing communication between said cooling fluid inlet and the interior of said conduit; means for establishing communication between said outlet and the interspace between said tube and said conduit, means for applying fluid pressure to said piston to force it into engagement with said ejector tube and thereby eject said welding electrode, said movement of the piston also being effective to close said opening and said cooling fluid inlet, and means to return said piston to its original position after the fluid pressure has been removed, the return of said piston being effective to open said cooling fluid inlet.

5. In an ejector type welding electrode holder, a body including a longitudinally-extending passage, a socket for receiving a welding electrode formed at one end of said passage, an ejector tube disposed in said passage and adapted to engage said electrode, a piston mounted in an enlarged portion of said passage for engagement with said ejector tube, said piston having an inner recessed portion which normally communicates with a cooling fluid inlet formed in said body, a conduit secured to said piston and communicating with said inner recessed portion, said conduit extending through said passage to supply cooling fluid to said welding electrode, the interspace between said conduit and said ejector tube normally communicating through said tube with a cooling fluid outlet formed in said body, a pressure chamber for said piston, means for applying fluid pressure to said chamber to force the piston into engagement with said ejector tube and thereby eject said welding electrode, the movement of said piston also being effective to move said recessed portion out of communication with said inlet and to interpose a portion of said tube between said interspace and said outlet thereby to close said cooling fluid inlet and said cooling fluid outlet, and means for retracting said piston after the fluid pressure has been removed therefrom, the retraction of said piston also being effective to open said cooling fluid inlet and said cooling fluid outlet.

6. In an ejector type welding electrode holder, a hollow body, a socket therein for receiving a welding electrode, an ejector tube disposed in said hollow body and adapted to bear against said welding electrode, a piston disposed in said body for engagement with said tube, a cooling fluid conduit mounted inside said tube and secured to said piston, said conduit consisting of inner and outer telescopic sections, means for urging the inner section into engagement with the welding electrode, a cooling fluid inlet and a cooling fluid outlet formed in said tube, means for establishing communication between said cooling fluid inlet and the interior of said conduit, means for establishing communication between said outlet and the interspace between said tube and said conduit, means for fluid applying pressure to said piston to force it into engagement with said ejector tube and thereby eject said welding electrode, said piston and said member being constructed and arranged to close said cooling fluid inlet and said cooling fluid outlet upon such movement of the piston, means for sealing said piston and said hollow body between said inlet and said outlet, and means for sealing said piston and said body at a position between the inlet and the adjacent end of the electrode holder.

7. An ejector type welding electrode holder comprising a hollow body, a socket therein for receiving a welding electrode, ejector means including a member adapted to move into engagement with said electrode to eject it from the socket and a plunger adapted for engagement with said member, a cooling fluid inlet and a cooling fluid outlet, said ejector means having an opening formed therein communicating with said inlet in one position of said plunger, and means for delivering cooling fluid from the inlet through said opening to the welding electrode and then returning the cooling fluid to said outlet, said opening being closed by said ejector means when the plunger is moved to electrode ejecting position.

EARL I. LARSEN.

REFERENCES CITED

The following references are of record in the file of this patent:

UNITED STATES PATENTS

| Number | Name | Date |
|---|---|---|
| 2,004,620 | Tarbox | June 11, 1935 |
| 2,271,119 | Cox et al. | Jan. 27, 1942 |
| 2,374,979 | Carlson et al. | May 1, 1945 |
| 2,379,983 | Munson | July 10, 1945 |
| 2,385,108 | Seeloff | Sept. 18, 1945 |